UNITED STATES PATENT OFFICE 1,980,691

DOUBLE CARBONATES OF SODIUM AND AMMONIUM

Robert Burns MacMullin, Niagara Falls, N. Y., assignor to The Mathieson Alkali Works, Inc., New York, N. Y., a corporation of Virginia No Drawing. Application March 21, 1932, Serial No. 600,379

3 Claims. (Cl. 23—61)

This invention relates to a new product, specifically a new double carbonate of sodium and ammonium.

I have discovered that a double carbonate of sodium and ammonium which, so far as I am aware, has not heretofore been known can be formed, under appropriate conditions, by bringing together, in the presence of water, sodium, ammonium and carbonate ions. This new double salt has a composition corresponding to the following formula:

$$NaNH_4CO_3 \cdot xH_2O$$

In this formula "$x$" may have a value of from 1 to 2 inclusive. The components Na, $NH_4$ and $CO_3$ are present in the ratio of 1:1:1. This new double salt is easily identified by analysis, by its crystalline form, and by its optical properties. The crystals apparently belong to the monoclinic, although possibly to the triclinic system, elongated parallel to $c$. The crystals grow as large needles which when flat appear as elongated parallelograms with the end faces approximately at 45° to the elongation. The indices of refraction are approximately as follows: alpha 1.390, beta 1.494 and gamma 1.506. The orientation is X parallel to $b$, Y inclined to $c$ 19.5°. The optic angle 2E is approximately −60°, with pronounced cross dispersion.

This new double salt can be produced by different methods of procedure. The three following methods have been found advantageous:

Method I.—Sodium carbamate, $NaNH_2CO_2$ is hydrated, with moist air for example, at a temperature approximating 20–25° C.

Method II.—A solution of a soluble sodium salt, sodium chloride or sodium nitrate for example, in aqueous ammonia, containing about 50% $NH_3$ for example, is carbonated, advantageously at a temperature not higher than about 30° C. If the $NH_3$ concentration or the temperature is too high, sodium carbamate will form. If the $NH_3$ concentration is too low, sodium bicarbonate or sodium sesquicarbonate will form. The new double salt crystallizes from the solution and is separated, by filtering or centrifuging for example.

Method III.—A solution of a soluble sodium salt, sodium chloride or sodium nitrate for example, in aqueous alcohol containing ammonia is carbonated, the new double salt crystallizes from the solution and is separated, by filtering or centrifuging for example. Ethyl alcohol and methyl alcohol are useful in this method. If the alcohol concentration, or the temperature, is too high, sodium carbamate will form either with or to the exclusion of the new double salt. The following example will illustrate an embodiment of this method:

Example 1.—62 grams of ammonia, either as a gas or as a liquid, is added to 1600 cc. of aqueous alcohol containing 50% by volume of ethyl alcohol, and this solution is saturated with sodium nitrate, about 366 grams of sodium nitrate being required. This solution, saturated with sodium nitrate, is maintained at a temperature of 25° C. while 350 grams of ammonium carbamate, $NH_4NH_2CO_2$, is added with stirring. The new double salt begins to crystallize and the temperature is gradually reduced to 0° C. About 300–400 grams of the new double salt, in the form of large and well developed crystals, are recovered. After separation from the mother liquor, by filtration for example, the crystals are washed with the same aqueous alcohol and dried at a temperature of 20–25° C. The double salt so produced has an analysis corresponding to the following formula:

$$NaNH_4CO_3 \cdot 2H_2O$$

If too much ammonium carbamate is added or if the temperature is permitted much to exceed 35° C. in the method of the foregoing example, the solution tends to separate into two distinct liquid bodies. Such separation of the solution is to be avoided if well developed crystals of the new salt are to be obtained.

In carrying out either the second or third of the foregoing methods, the carbon dioxide for carbonation can be supplied, for example, either as carbon dioxide as such or as ammonium carbamate.

The new double salt is useful as a detergent, as a cleanser and as a water softener, for example. It is also useful as an intermediate in the manufacture of carbonates and carbamates of sodium. By dehydrating the new double salt at low temperature, 25° C. or lower for example, hydrated double carbonates of sodium and ammonium containing less than two molecules of water of crystallization per molecule of the double carbonate can be produced. By continued dehydration at low temperature, sodium carbamate can be produced. By heating the new double salt at temperatures somewhat below 100° C., it can be dehydrated, de-ammoniated and decarbonated, to produce sodium carbonate monohydrate, $Na_2CO_3 \cdot H_2O$. By continued heating at higher temperatures, above 100° C., dense sodium carbonate can be produced. The sodium carbonate so produced is of high chemical purity and has particularly desirable physical characteristics.

I claim:

1. As a new product, a double salt containing the components Na, $NH_4$ and $CO_3$ in the ratio of 1:1:1 and water of crystallization.

2. As a new product, a double salt having the formula $NaNH_4CO_3 \cdot xH_2O$ in which $x$ has a value of from 1 to 2 inclusive.

3. As a new product, a double salt having the formula $NaNH_4CO_3 \cdot 2H_2O$.

ROBERT BURNS MacMULLIN.